Figure 1:
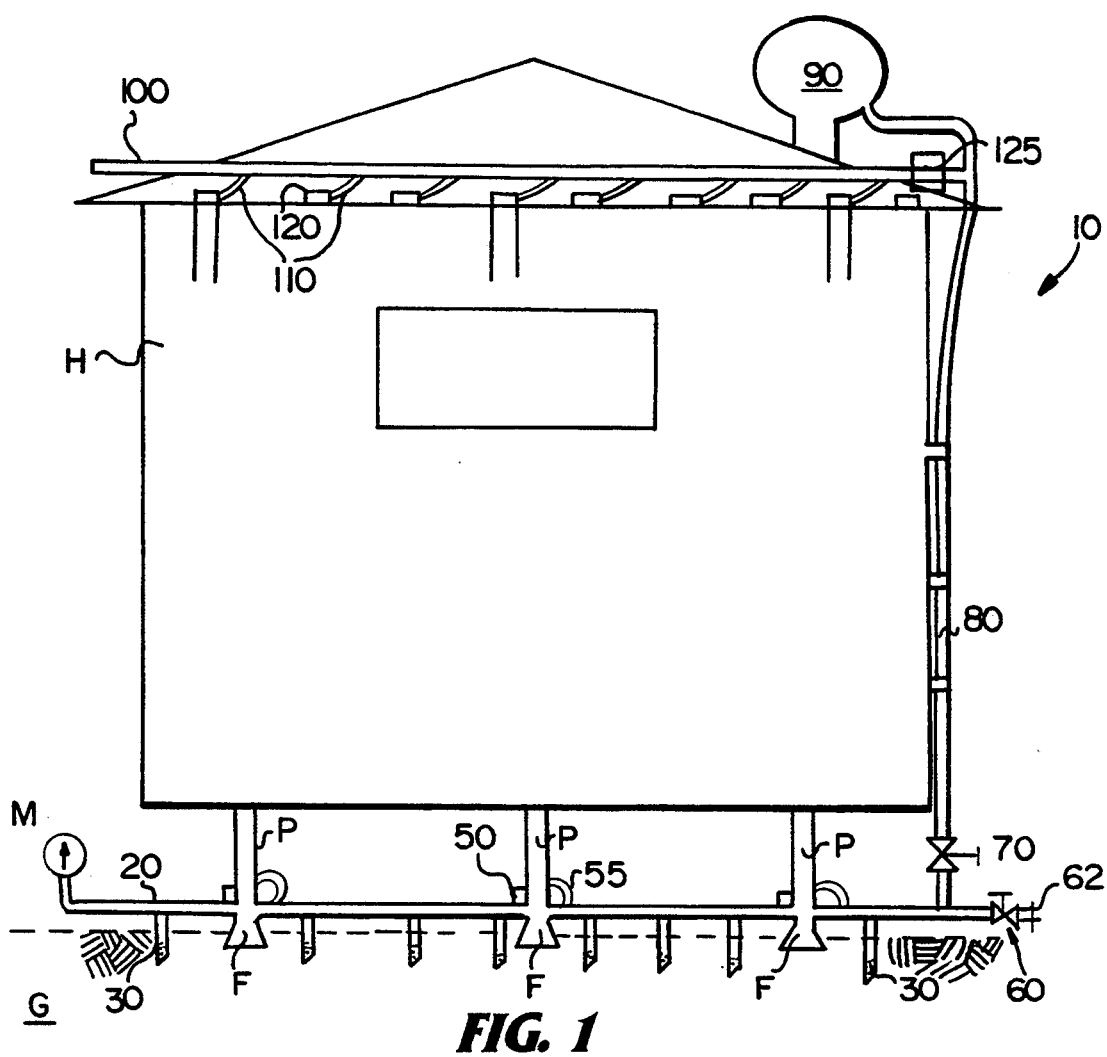

United States Patent [19]

Takaoka

[11] Patent Number: 5,394,642
[45] Date of Patent: Mar. 7, 1995

[54] RETROFITTABLE INSECTICIDE DISTRIBUTION SYSTEM

[76] Inventor: Toshio Takaoka, 3652 Hilo Pl., Honolulu, Hi. 96816

[21] Appl. No.: 132,712

[22] Filed: Oct. 5, 1993

[51] Int. Cl.6 .............................................. A01M 13/00
[52] U.S. Cl. ........................................ 43/124; 43/900
[58] Field of Search ................. 43/124, 125, 107, 108, 43/109, 132.1, 900

[56] References Cited

U.S. PATENT DOCUMENTS

| Re. 25,080 | 11/1961 | Griffin | 43/124 |
|---|---|---|---|
| 1,795,488 | 3/1931 | Hill | 43/124 |
| 2,842,892 | 7/1958 | Aldridge et al. | 43/124 |
| 2,915,848 | 12/1959 | Griffin | 43/124 |
| 2,981,025 | 4/1961 | Woodson | 43/124 |
| 3,124,893 | 3/1964 | Glenn | 43/124 |
| 3,513,586 | 5/1970 | Meyer et al. | 43/124 |
| 3,589,054 | 6/1971 | Pascucci | 43/124 |
| 3,676,949 | 7/1972 | Ramsey | 43/124 |
| 3,909,975 | 10/1975 | Basile | 43/124 |
| 4,028,841 | 6/1977 | Lundwall | 43/124 |
| 4,625,474 | 12/1986 | Peacock et al. | 52/101 |
| 4,742,641 | 5/1988 | Cretti | 43/132.1 |
| 4,800,672 | 1/1989 | Jackson | 43/125 |
| 4,809,462 | 3/1989 | Maeda | 43/124 |
| 4,858,375 | 8/1989 | Mountain | 43/124 |
| 4,989,363 | 2/1991 | Doernemann | 43/124 |
| 5,007,197 | 4/1991 | Barbett | 43/124 |
| 5,094,045 | 3/1992 | Tamashiro | 52/101 |

FOREIGN PATENT DOCUMENTS 2213695  8/1989  United Kingdom ................. 43/124

Primary Examiner—P. Austin Bradley
Assistant Examiner—Chuck Y. Mah
Attorney, Agent, or Firm—Martin E. Hsia

[57] ABSTRACT

A retrofittable insecticide distribution system comprising an above ground horizontal pipe (20) having a plurality of vertical pipes (30) penetrating into the ground. Fluid absorbing means (56) in housings (50) are provided around the ends of horizontal and vertical members and communicate with the horizontal pipes or a vertical pipe. Insecticide can be introduced into the system either by pumping or by being placed in an elevated reservoir (90) with gravity providing the pumping force. The vertical pipes in the ground can be provided with a variety of distribution means, including simple holes, a downwardly oriented sprinkler head (42) or a distribution ball (44) having a plurality of slots (46) filled with plastic beads (48).

23 Claims, 3 Drawing Sheets

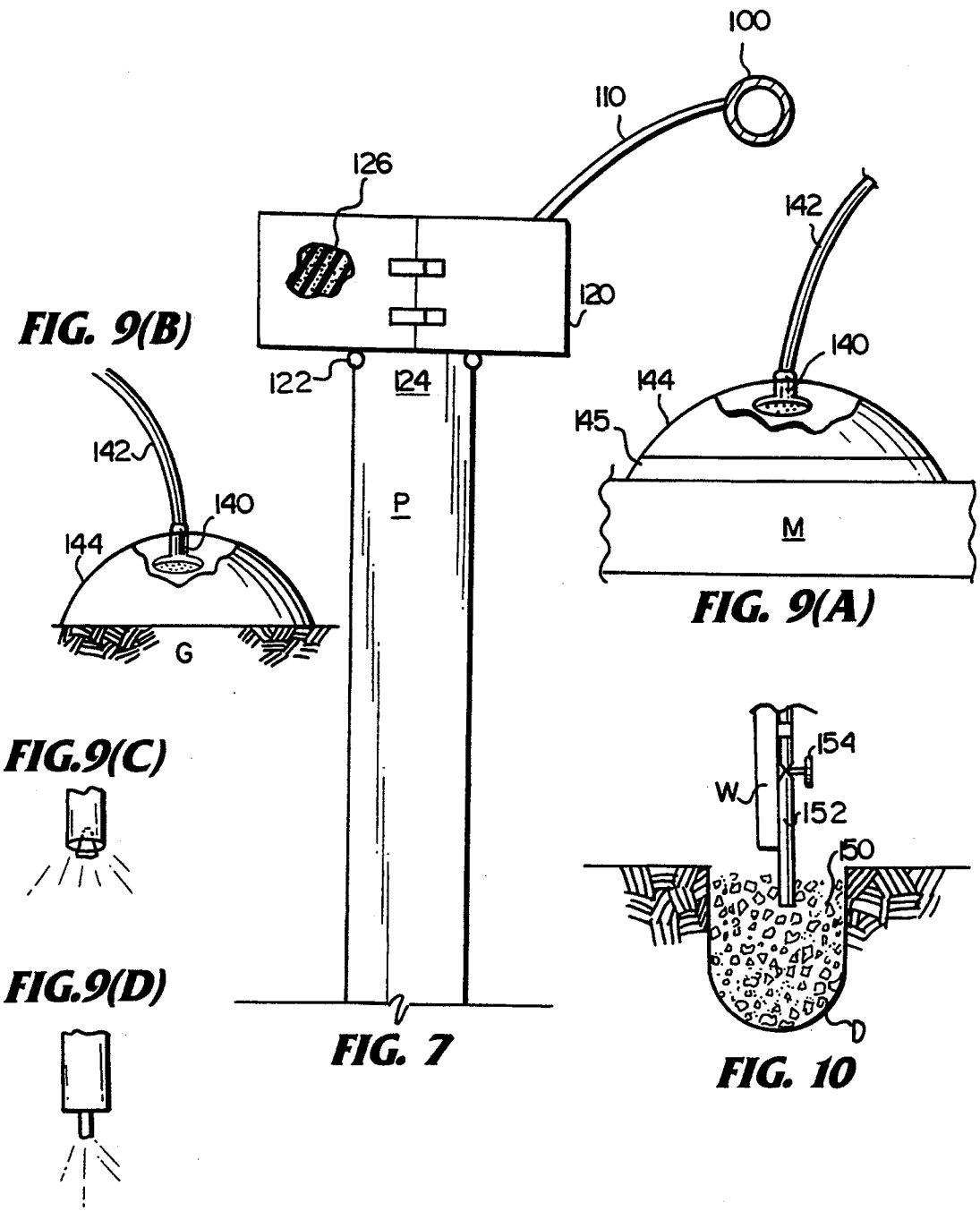

RETROFITTABLE INSECTICIDE DISTRIBUTION SYSTEM

TECHNICAL FIELD

This invention relates to a retrofittable insecticide distribution system.

Insects have caused and continue to cause great damage to buildings and other structures. Accordingly, there is a great need for methods and systems to prevent such damage, especially by termites, including both subterranean or ground termites and airborne or drywood termites.

BACKGROUND ART

Many approaches have been tried to prevent damage by insects, including termites, to buildings and other structures. One primary approach is to use chemicals or other substances that are toxic to insects, including termites. Another approach is to create physical barriers to entry by insects, including termites. Still another approach is to use particular methods of building construction to protect against damage by insects, including termites.

U.S. Pat. No. RE. 25,080 to Griffin discloses a built in insecticide distribution system having a main tube with branch tubings extending laterally from the main tube and having discharge spouts.

U.S. Pat. No. 2,842,892 to Aldridge et al. discloses a system of tubing to be placed under a concrete slab.

U.S. Pat. No. 5,007,197 to Barbett discloses a termite control system using drip irrigation tubing placed underneath a slab.

U.S. Pat. No. 4,625,474 to Peacock discloses a termite control system using an underground tube associated with foundation components of a building with the tube having discharge openings by which an insecticide may be discharged into ground areas adjacent to the foundation.

U.S. Pat. No. 3,124,893 to Glenn discloses a method of dispersing fluid beneath slab floors by drilling vertical passages through the slab and pushing a plug into the passage to create a substantially fluid tight engagement with the walls of the passage, and then forcing a fumigant through the plug and into the soil.

U.S. Pat. No. 2,981,025 to Woodson discloses applying a toxic liquid under pressure through a flexible hose to a pipe installed underneath a floor.

U.S. Pat. No. 3,153,586 to Meyer et al. discloses a vermin proof building foundation including a distribution conduit extending along and within a space defined by certain support members for distributing an insecticide to the interior of a foundation.

U.S. Pat. No. 1,795,488 to Hill discloses a means for eradicating insects comprising a pipe disposed along the inner face of a wall having a longitudinal row of perforations.

U.S. Pat. No. 4,809,462 to Maeda discloses a method of exterminating insects by dispensing a fine adhesive powder under pressure under the floor of a house or building.

U.S. Pat. No. 4,742,641 to Cretti discloses a permanently installed pest extermination system including a trunk tube connected to a pump to receive pressurized exterminating liquid and one or more branch tubes extending throughout the building near the floor, each branch tube having a plurality of outwardly directed small apertures piercing its wall to effect nozzles through which pressurized exterminating liquid is dispensed.

U.S. Pat. No. 4,858,375 to Mountain discloses an applicator apparatus including an end pointed applicator pipe having a pattern of outlet holes located in a span of about 90 degrees at the circumference of the pipe.

U.S. Pat. No. 3,909,975 to Basile discloses a network of perforated pliable pipes in a normally collapsed condition.

U.S. Pat. No. 3,676,949 to Ramsey discloses an insecticide distribution system consisting of pipes through the joists, rafters and partitions of a building.

U.S. Pat. No. 5,094,045 to Tamashiro discloses a termite barrier comprising granular material having granules with sizes ranging from 1.7 millimeters to 2.4 millimeters made of sand, gravel, rock or basalt.

The ground under certain areas of a house (such as under the bathrooms) might be moist and therefore attract insects. Presently, charcoal made from Kunugi wood (a type of oak) or oak charcoal is spread on the ground under these moist areas because insects do not like these types of charcoal due to an ionization effect, it is believed.

A problem with most of the insecticide distribution systems using pipes is that the horizontal portions of the pipes are either underground, inside walls or other structural portions, or otherwise inaccessible and therefore become clogged between uses by insects, dirt or other debris. The insecticide itself might crystallize, which also might clog the horizontal pipe. Thus, any insecticide distribution system having underground or otherwise inaccessible horizontal pipes often will become useless after the first application because insecticides would normally be applied at intervals of many years.

A further major problem with most of the insecticide distribution systems of the prior art is that they must be installed at the time of construction of a building or structure and cannot be readily or easily retrofitted to existing buildings or structures. Further, the horizontal pipes may break or crack if they are installed under a concrete slab (or other structure) that settles.

A further disadvantage of the prior art methods and apparatus is that they are usually directed against subterranean termites, whereas airborne or dry rot termites also cause substantial damage.

It is known to coat the exterior surface of lumber or other building materials with insecticides in order to deter termite damage. However, when the building materials are cut or the surface is otherwise broken, termites and other insects are then able to penetrate to the interior of the member.

Other building materials impregnated throughout their volume with insecticides are known, but these building materials are many times more expensive than untreated building materials or building materials treated only on the surface.

It is therefore an object of this invention to provide a system for preventing damage to buildings and other structures by insects, including termites.

It is a further object of this invention to provide such a system that can be retrofitted to existing structures.

It is a still further object of this invention to provide such a system that can be used repeatedly and that can be used with a variety of different insecticides, including insecticides that have not yet been developed.

It is a still further object of this invention to provide such a system that complements other methods for preventing such damage.

DISCLOSURE OF INVENTION

The retrofittable insecticide distribution system of this invention comprises an accessible horizontal pipe above the ground, a plurality of vertical pipes with upper portions communicating with the horizontal pipe, lower portions penetrating into the ground, and applicator means connected with the lower portion. The applicator means can be a plurality of holes in the lower portions of the vertical pipes; a downwardly oriented sprinkler head; a sprinkler head having an umbrella covering to control the spray area; a plurality of holes at the lower end of the vertical pipes with the lower end plugged and placed in an applicator pit dug into the ground and lined with stones; or a ball containing a plurality of plastic beads. The choice of applicator means can be varied according to the type of soil conditions or structural member to which the insecticide is to be applied. Optionally, an elevated insecticide reservoir communicating with the horizontal pipe can be provided, so that gravity will provide sufficient pressure to distribute the insecticide through the horizontal pipe. Optionally, an elevated horizontal pipe can be employed to protect elevated portions of structural members or elevated structural members, and an optional compressor can be operably connected to the elevated reservoir to provide pressure for the elevated horizontal pipe if gravity will not create sufficient pressure. Preferably the pipes comprise plastic, optimally polyvinyl chloride plastic.

The retrofittable insecticide distribution system also comprises a fluid absorbing means (preferably a sponge) surrounding a portion of a building member, fluid retaining means (preferably a housing having a gasket sealingly engaged against the building member) surrounding the fluid absorbing means for retaining fluid in the fluid absorbing means, and fluid transportation means (preferably a hose) for transporting a fluid to the fluid absorbing means through the fluid retaining means.

Certain existing houses might have walls that do not extend into the ground, such as houses on hills or certain "plantation" houses, which might have skirtings. For these types of houses (or houses where the walls penetrate into the ground but this protection is still desired), a ditch or other cavity can be formed under the wall and partially or completely filled with sand, preferably to a depth of 6 inches to 2 feet. The sand can be kept continuously moistened with insecticide through a vertical pipe having a valve attached to the distribution system described above.

Because the horizontal pipes are above the ground and are sealed, the problem of infiltration by debris, insects or other materials is eliminated in the horizontal pipes and, even if such a problem arises, the horizontal pipe remains accessible for maintenance and repair. The vertical pipes provide multiple penetration into the ground at multiple independent locations, which allows the system to function even if one or more of the vertical pipes becomes clogged. Vertical building members can be protected merely by placing the sponge and housing assembly at the bottom of the member and allowing capillary action to carry the fluid upwards through the member. However, the housing, sponge and gasket can also be used for horizontal members by placing them at the ends. Building members or surfaces also can be protected by using a pipe with a sprinkler head shrouded in an umbrella which controls the area sprayed so that insecticide does not drip off the edges and which also prevents evaporation of the sprayed insecticide. It is preferred that a fluid absorbing means, such as a sponge, be placed under the umbrella, unless the umbrella is used to apply the fluid to the ground. Because insects, especially termites, tend to attack building members through the ends rather than the sides, these techniques can be used on the ends to provide substantially greater protection than using lumber treated only on the surfaces but with ends that have been cut during construction. Using these techniques on surfaces such as ceilings also can protect against dry rot and airborne termites.

Although this invention preferably employs non-toxic, environmentally benign insecticides (now known or hereafter developed), other liquids with insecticidal or other desirable properties can be used, such as salt solutions.

BRIEF DESCRIPTION OF THE DRAWINGS

FIG. 1 is a general schematic elevational view of a preferred embodiment of the invention.

FIG. 2(*a*) is a detailed view of the lower portion of a vertical pipe shown in FIG. 1, with a plurality of holes as the applicator means.

FIG. 2(*b*) is the same as FIG. 2(*a*) with the addition of a plug.

FIG. 2(*c*) is the same as FIG. 2(*a*) or FIG. 2(*b*) with the addition of a soil screen.

FIG. 3 illustrates the lower portion of a vertical pipe as shown in FIG. 2(*a*) in a gravel-lined pit.

FIG. 4 illustrates an alternative embodiment employing a downwardly oriented sprinkler head in a gravel-lined pit.

FIG. 5 illustrates still another alternative embodiment employing a distribution ball having holes filled with small beads.

FIG. 6 illustrates a fluid absorbing means, a retainer means and a fluid transportation means for protecting the bottom of a vertical structural member.

FIG. 7 illustrates a fluid absorbing means, fluid retaining means and fluid transportation means employed to protect the upper end of a vertical member.

FIG. 8 illustrates a fluid retaining means, fluid absorbing means and fluid transportation means employed to protect the end of a horizontal member.

FIG. 9(*a*) illustrates a sprinkler head having an umbrella for containing the spray as applied to a horizontal member.

FIG. 9(*b*) illustrates a sprinkler head having an umbrella for containing the spray as applied to the ground.

FIG. 9(*c*) illustrates a "garden hose" type sprinkler head.

FIG. 9(*d*) illustrates an "aerosol spray" type sprinkler head.

FIG. 10 illustrates a ditch filled with gravel having a fluid transportation means for providing insecticide for the gravel.

DETAILED DESCRIPTION OF A PREFERRED EMBODIMENT

Referring generally to FIG. 1, a retrofittable insecticide distribution system is illustrated as installed on a house H. The system 10 generally comprises an accessible ground level horizontal pipe 20 having a plurality of short vertical pipes 30 attached to and communicating with the ground level horizontal pipe 20 and penetrating into the ground G. The house H is supported on posts P on concrete footings F. The horizontal pipe H is preferably unenclosed so that access can be gained to any portion that might become clogged without having to disassemble or damage any type of surrounding enclosure. However, a pipe will still be deemed accessible even though it is enclosed if access can still be gained to a major portion of its length through apertures, doors, or non-destructive disassembly of the enclosure. Thus, it would not be preferred to enclose the horizontal pipe H inside a wall or floor or other structural portion of the house, unless access doors allowing access to a major portion of its length also are provided.

The lower portions of the posts P are protected against insects, especially including termites, by a fluid retaining means 50 communicating with the ground level horizontal pipe 20 through ground level fluid transportation means, preferably ground level hoses 55. Optionally disposed along the horizontal pipe 20 is a pressure meter M. The round level horizontal pipe 20 preferably is provided with first stopcock 60 controllably communicating with a feeder pipe 62. Preferably also, a second stopcock 70 is provided to allow the ground level horizontal pipe 20 to communicate with a vertical pipe 80. Preferably the top of the vertical pipe 80 communicates with an insecticide container 90 located on an elevated portion of the house H. The insecticide container 90 preferably also communicates with an upper level horizontal pipe 100 provided with a plurality of upper fluid transportation means, preferably upper level hoses 110 that lead to upper fluid retaining means 120 surrounding the upper portions of the posts P of the house H. The elevated height of the insecticide container 90 preferably creates sufficient pressure to cause a gravity feed to the ground level horizontal pipe 20. Optionally, a compressor 125 of conventional design is operably connected to the upper level horizontal pipe to provide pressure for distributing insecticide to the upper level hoses 110 and the upper fluid retaining means, because the elevated level of the upper level horizontal pipe may prevent sufficient pressure to be created by gravity alone.

Figure 2A:
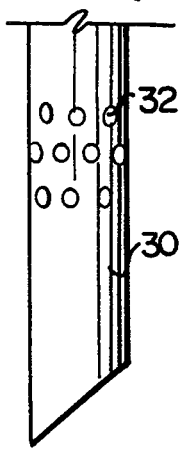

Referring to FIG. 2(a), shown is the lower portion of a vertical pipe 30 from FIG. 1 provided with a plurality of holes 32 through which an insecticide can be pumped. Preferably, the holes are approximately 2 millimeters in diameter.

Figure 2B:
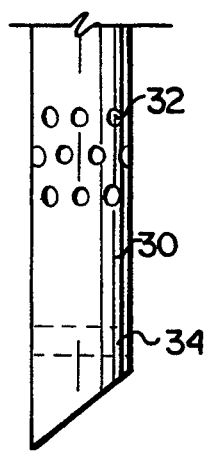

Referring to FIG. 2(b), shown is a similar vertical pipe 30 having holes 32, but also provided with a plug 34 at its lowest end.

Figure 2C:
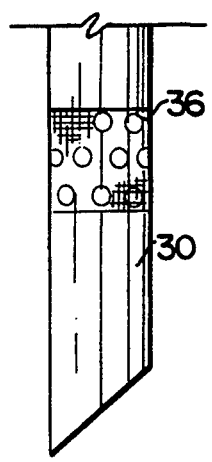

Referring to FIG. 2(c), shown is the lower end of a vertical pipe according to either FIG. 2(a) or 2(b), but also provided with a soil screen 36, preferably comprising a metal or plastic mesh. Preferably, the soil screen is of sufficient fineness that rocks, gravel, insects and other debris are prevented from blocking the holes 32.

Figure 3:
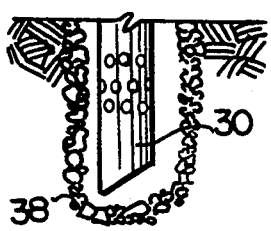

Referring to FIG. 3, shown is the lower end of a vertical pipe 30 according to FIG. 2(a), FIG. 2(b) or FIG. 2(c) disposed in a pit in the ground lined with gravel 38. Preferably, where soil or ground conditions permit penetration of termites or other insects, the gravel 38 comprises granules of appropriate size to prevent penetration of termites, as disclosed by U.S. Pat. No. 5,094,045 to Tamashiro, which is incorporated herein by reference.

Figure 4:
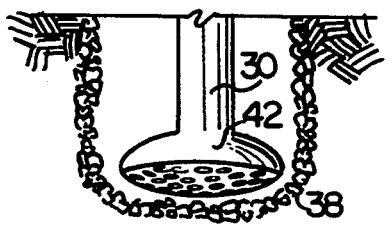

Referring to FIG. 4, shown is the lower end of a vertical pipe 30 provided with a downwardly oriented sprinkler, also in a pit lined with gravel 38.

Figure 5:
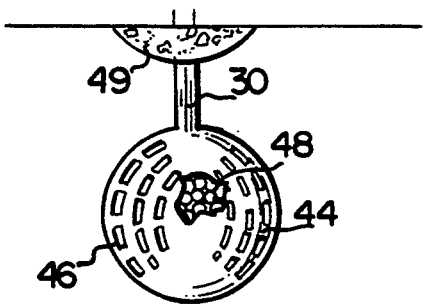

Referring to FIG. 5, shown is a vertical pipe 30 provided with a distribution ball 44 having a plurality of slots 46. Preferably the distribution ball 44 is hollow and has a diameter from approximately 2.5 inches to approximately 7 inches and is filled with beads 48, preferably made from a weatherproof plastic and preferably less than ½ inch in diameter. Of course, it is preferred that the slots 46 be small enough to retain the beads 48 inside the distribution ball. Preferably a concrete cap 49 is provided above the distribution ball.

Figure 6:
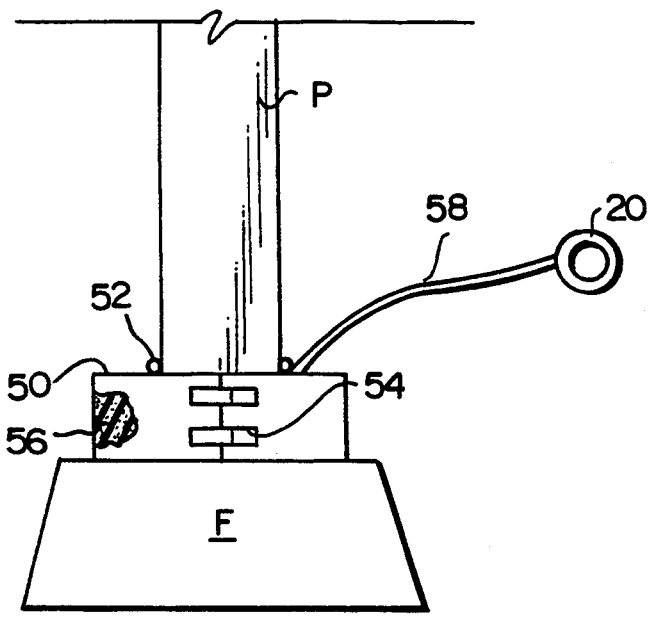

Referring to FIG. 6, shown is a detailed view of the lower end of a post P on a footing F showing a fluid retaining means, preferably a fluid tight housing having a gasket and closable with clamps 54 around the bottom portion of the post P to provide a fluid-proof enclosure around the bottom of the post P. Preferably a fluid absorbing means such as a sponge 56 is provided in the container 50, and a hose 58 communicating with the ground level horizontal pipe 20 and the inside of the container 50 is also provided. Thus, insecticide provided through the ground level horizontal pipe 20 will travel through the hose 58 and be absorbed by the sponge 56. The bottom of the post P therefore will be bathed in the insecticide. Preferably also, the insecticide will be absorbed into the post P by capillary action to provide further protection against insects, especially termites.

Referring to FIG. 7, shown is a housing 120 attached to the top of a post P using clamps 124 and forming a fluid-proof enclosure with gaskets 122 and filled with a sponge 126. A hose 110 communicates with the upper horizontal pipe 100.

Figure 8:
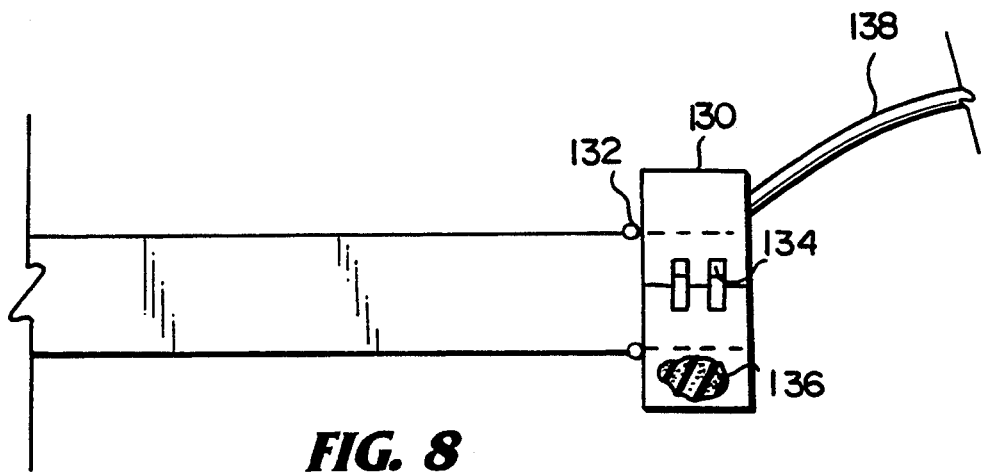

Referring to FIG. 8, shown is a similar construction for protecting a horizontal building member using a housing 130 with gasket 132 and clamps 134 with sponge 136.

Referring to FIG. 9 (a), shown is a "shower" type sprinkler head 140 positioned above a horizontal member M and being provided with insecticide through a fluid transportation means, preferably a hose 142. An umbrella 144 is provided over the sprinkler head 140 and the horizontal member M in order to limit the area of the surface of the member M sprayed by insecticide being forced through the sprinkler head 140. The umbrella preferably comprises a soft material supported by a rigid frame. Preferably, a fluid retaining material 145, such as a sponge, is provided under the umbrella. Preferably, the umbrella 144 is sealingly engaged with the surface of the horizontal member M so that insecticide sprayed through the sprinkler head 140 and onto the surface of the member M is prevented from evaporating or dripping. Of course, this configuration also can be used on ceilings, beams or other surfaces or members that are not horizontal.

The "shower" type sprinkler head 140 and umbrella 144 configuration also can be used directly on the surface of the ground G, as shown in FIG. 9(*b*), if soil conditions permit, or if soil conditions prevent using the other configurations shown in FIGS. 2(*a*), 2(*b*), 2(*c*), 3, 4 and 5. A fluid retaining means is not preferred when this configuration is used to treat the ground, however. Of course, alternative types of sprinkler heads can be used, depending on conditions, such as a "garden hose" type sprinkler, with a central obstruction, as shown in FIG. 9(*c*), or an "aerosol spray" type sprinkler, as shown in FIG. 9(d). For example, a "shower" type sprinkler head may be preferred where pressure is provided by gravity flow, but the "garden hose" or "aerosol spray" sprinkler heads may be preferred where pressure is provided by a compressor.

Referring to FIG. 10, shown is a ditch D under a wall member W that does not reach the ground or that rests on or in the ground (but is not load bearing). The ditch D is filled with some fluid retaining material 150, preferably gravel. A fluid transportation means 152, preferably a hose, is in fluid communication with the fluid retaining material 150, preferably by being mounted on the wall W and extending into the fluid retaining material 150. A fluid control means 154, preferably a valve, is preferably provided to control the fluid transported through the fluid transportation means. A fluid insecticide is then controllably transported through the fluid transportation means 152 and into the fluid retaining material 150 so that the material is kept charged or moistened with insecticide.

If multiple vertical ground penetrating pipes will be used, one of the various embodiments of vertical pipes illustrated in FIG. 2(a), 2(b) or 2(c) would be chosen for installation, depending on soil conditions. Also depending on soil conditions, the vertical pipes 30 might be placed directly in the ground or placed in a gravel-lined pit as shown in FIG. 3, provided with a downward oriented sprinkler head as shown in FIG. 4 or provided with a distribution ball as shown in FIG. 5. An insecticide, preferably an organic, non-toxic and non-pollutive liquid, will be pumped under pressure through feeder pipe 62 and stopcock 60 will be opened to allow the insecticide to be pumped into the ground level horizontal pipe 20 at an appropriate pressure measured by the pressure meter M. Alternatively, the insecticide can be introduced into the elevated reservoir 90 and the second stopcock 70 on the vertical pipe 80 can be opened to allow the insecticide to be forced into the vertical pipes 30 through hydraulic pressure caused by the difference in altitude between the container 90 and the vertical pipes 30. Preferably also, insecticide from the container 90 flows into the upper horizontal pipe 100 where it communicates through hoses 110 in order to allow insecticide to be absorbed into the sponges 126 at the tops of the posts P.

In certain circumstances where multiple vertical ground penetrating pipes are not preferred, a ditch D as shown in FIG. 10 could be dug in the ground under a wall W and filled with a fluid retaining material 150, preferably a granular material such as gravel or sand (hereinafter referred to as "gravel"). Fluid transportation means 152, preferably one or more hoses, then can be used to keep the fluid retaining material 150 charged with insecticide. The fluid transportation means 152 could be connected to the above ground horizontal pipe described above, or provided with some other source of fluid insecticide.

Optionally, horizontal members can be provided with containers 130 having hoses 138 communicating with the upper horizontal pipe 100 or the vertical pipe 80, as shown in FIG. 8. The insecticide then is expected to be absorbed by capillary action throughout the end portion of the horizontal member.

If the house is slab on grade construction so that the ground level horizontal pipe 20 cannot be laid underneath the house, then the vertical pipes 30 can be installed by drilling through the slab and the horizontal pipes can be installed by creating channels in the slab to accept the horizontal pipe.

Under certain soil or other conditions, the above embodiments can be combined and expanded by removing approximately 2 centimeters of soil from underneath the entire house and replacing the removed soil with sand. The horizontal pipes then could be placed above the sand and under any portions of structural members within a certain distance above the sand, including structural members spanning the underside of the house (not just those members on the periphery of the house). Vertical ground penetrating pipes, with various applicator means at the lower portions (as shown in FIGS. 2–5) could be installed in various places in the sand (not just on the periphery, but also under the interior of the structure) and could be connected to the horizontal pipes. Fluid transportation means and fluid retaining means as described in FIGS. 1 and 6–9 and their accompanying text could be used to distribute insecticide directly to those portions of structural members within a certain distance, say 2 feet, of the sand. Further, insecticide could be provided directly into the sand, as indicated in FIG. 10 and its accompanying text. However, preferably, there would be, at a minimum, one vertical ground penetrating pipe for each structural member (such as a support pole) extending into the ground.

From the above, it can be seen that this system provides a retrofittable insecticide distribution system that allows insecticide to be distributed to horizontal and vertical members to provide virtually complete protection against damage from insects, especially termites. Further, the insecticide distribution system is not dependent on any particular insecticide and therefore can be used in conjunction with any insecticide that can be carried by a fluid. Further, any chemical with insecticidal or insect repellant or retardant properties can be used (as long as it can be carried by a fluid), such as a salt solution.

The invention has been described with respect to a particular preferred embodiment. However, many changes and modifications can be made without departing from the scope or spirit of the invention. Accordingly, no limitations are to be implied or inferred except as specifically set forth in the appended claims.

INDUSTRIAL APPLICABILITY

This invention is applicable wherever it is desired to provide a system to distribute insecticide to protect a structure, and can be used to retrofit existing structures with such a system.

What is claimed is:

1. A retrofittable insecticide distribution system for applying insecticide below the ground, said system having no horizontal underground components, comprising:

a structure supported by the ground;

an accessible horizontal pipe above the ground and outside said structure;

a plurality of vertical pipes having upper and lower portions, said upper portions communicating with said horizontal pipe, said upper portions being above the ground;

applicator means placed below the ground and operably connected with said lower portion of at least one of said vertical pipes for applying said insecticide below the ground.

2. A system according to claim 1, wherein said applicator means comprises an applicator pipe segment having a plurality of holes attached to said lower portions.

3. A system according to claim 2, wherein said applicator pipe segment and said lower portion are integrally formed.

4. A system according to claim 3, wherein said applicator pipe segment and said lower portion are integrally formed by forming holes in said lower portions.

5. A system according to any one of claims 2 to 4, wherein said holes are approximately 2 millimeters in diameter.

6. A system according to claim 1, wherein said applicator means comprises a downwardly oriented sprinkler head.

7. A retrofittable insecticide distribution system for applying insecticide below the ground, said system having no horizontal underground components, comprising:
   an accessible horizontal pipe above the ground;
   a plurality of vertical pipes having upper and lower portions, said upper portions communicating with said horizontal pipe, said upper portions being above the ground;
   applicator means placed below the ground and operably connected with said lower portion of at least one of said vertical pipes for applying said insecticide below the ground;
   wherein said applicator means comprises an applicator pipe segment having a plurality of holes attached to said lower portions;
   wherein said holes are approximately 2 millimeters in diameter;
   further comprising a soil screen covering said holes.

8. A system according to claim 7, wherein said applicator pipe segment and said lower portion are integrally formed.

9. A system according to claim 8, wherein said applicator pipe segment and said lower portion are integrally formed by forming holes in said lower portions.

10. A retrofittable insecticide distribution system for applying insecticide below the ground having no horizontal underground components, comprising:
    an accessible horizontal pipe above the ground;
    a plurality of vertical pipes having upper and lower portions, said upper portions communicating with said horizontal pipe, said upper portions being above the ground;
    applicator means placed below the ground and operably connected with said lower portion of at least one of said vertical pipes for applying said insecticide below the ground;
    wherein said applicator means comprises a hollow ball having a plurality of slots and further comprising a plurality of plastic beads inside said ball.

11. A retrofittable insecticide distribution system for applying insecticide in a plurality of applicator pits in the ground, comprising:
    a structure supported by the ground;
    a horizontal pipe above the ground and outside said structure;
    a plurality of vertical pipes having upper and lower portions, said upper portions communicating with said horizontal pipe, said upper portions being above the ground, and said lower portions extending downwardly into said applicator pits;
    applicator means placed in said pits and operably connected with said lower portion of at least one of said vertical pipes for applying said insecticide in said pits; and
    granules of appropriate size to prevent penetration of termites lining said applicator pits.

12. A system according to any one of claims 1, 2, 7, 8 or 11, further comprising:
    an elevated insecticide reservoir communicating with said horizontal pipe.

13. A system according to any one of claims 1, 2, 7, 8 or 11, wherein said horizontal pipe and said vertical pipes comprise plastic.

14. A system according to claim 13, wherein said plastic comprises polyvinyl chloride plastic.

15. A retrofittable insecticide distribution system for applying insecticide under a wall, wherein a ditch has been dug under said wall, comprising:
    an accessible horizontal pipe above the ground and outside said wall;
    a fluid retaining material placed in said ditch;
    a fluid transportation means for transporting a fluid in fluid communication between said horizontal pipe and said fluid retaining material; and
    fluid control means for controlling the transportation of fluid through said fluid transportation means.

16. A system according to claim 15, wherein said fluid retaining material comprises gravel.

17. A system according to claim 15, wherein said fluid transportation means is mounted on said wall.

18. A system according to claim 15, wherein said fluid control means comprises a valve.

19. A retrofittable insecticide distribution system for distributing insecticide underneath a structure supported above the ground by a plurality of building members in contact with the ground, whereby a space is defined between said structure and the ground, comprising:
    a layer of sand placed on the ground underneath said structure;
    an accessible horizontal pipe placed in said space above said sand and underneath said structure;
    fluid absorbing means for absorbing a fluid surrounding each of said building members;
    fluid retaining means for retaining a fluid in said fluid absorbing means surrounding said fluid absorbing means;
    fluid transportation means for transporting a fluid to said fluid absorbing means through said fluid retaining means;
    a plurality of vertical pipes having upper and lower portions, said upper portions communicating with said horizontal pipe, said upper portions being above the ground;
    applicator means placed below the ground and operably connected with said lower portion of at least one of said vertical pipes for applying said insecticide below the ground; and
    an elevated insecticide reservoir communicating with said horizontal pipe.

20. A retrofittable insecticide distribution system for applying insecticide to the ground, said system having no horizontal underground components, comprising:
    a structure supported by the ground;
    an accessible horizontal pipe above the ground and outside said structure;
    a plurality of vertical pipes having upper and lower portions, said upper portions communicating with said horizontal pipe, said upper portions being above the ground;

a sprinkler head in fluid communication with at least one of said lower portions of said vertical pipes supported above the ground;

whereby insecticide can be sprayed through said sprinkler head onto the ground.

21. A system according to claim 20, further comprising:

umbrella means mounted over said sprinkler head for limiting the area of the ground sprayed by insecticide.

22. A system according to claim 21, wherein said sprinkler head is selected from the group consisting of shower sprinkler heads, garden hose sprinkler heads and aerosol spray sprinkler heads.

23. A system according to claim 21, wherein said umbrella means is sealingly engaged with the ground.

* * * * *